United States Patent
Suh

[11] Patent Number: 5,995,627
[45] Date of Patent: Nov. 30, 1999

[54] SECURITY DEVICE FOR A SECTION PROCESSOR

[75] Inventor: Chung Wook Suh, Daejon-Shi, Rep. of Korea

[73] Assignee: Electronics and Telecommunications Research Institute, Daejon-shi, Rep. of Korea

[21] Appl. No.: 08/964,125

[22] Filed: Nov. 4, 1997

[51] Int. Cl.[6] .................................................. H04L 12/00
[52] U.S. Cl. .......................... 380/28; 713/160; 713/162; 713/168
[58] Field of Search ........................ 380/236; 713/160, 713/162, 168, 190, 191

[56] References Cited

U.S. PATENT DOCUMENTS 5,909,443  6/1999  Fichou et al. ........................... 370/412

*Primary Examiner*—Thomas R. Peeso
*Attorney, Agent, or Firm*—Cohen, Pontani, Lieberman & Pavane

[57] ABSTRACT

The present invention relates to a security device for section processor which can execute an information security function of high speed data in an super highway information network in real time by implementing an information security algorithm by hardware in the section processor. According to the present invention, related hardware can be easily implemented by simply imbedding an encoder and a decoder in the section processor of the super highway information network. Thus, a section processor having information security functions can be easily implemented in one integrated circuit. Also, the security device for section processor in accordance with the present invention is superior to other device in terms of an information security function itself, economicity, efficiency, and power consumption efficiency.

4 Claims, 3 Drawing Sheets

SECURITY DEVICE FOR A SECTION PROCESSOR

BACKGROUND OF THE INVENTION

1. Field of the Invention

The present invention relates to a security device for section processor, and more particularly, to a security device for section processor which can execute an information security function for high speed data in a super highway information network in real time by implementing an information security algorithm by hardware.

2. Description of the Related Art

The research towards the super highway information network which is currently being developed in many countries is focused on the development of the technologies required in the super highway information network itself. However, an information security function in the super highway information network has not yet been developed thus far. In this regard, works directed to the preparation of a draft as to the information security in the super highway information network have been initiated at the ATM (Asynchronous Transfer Mode) forum since 1995. However, these works are still in an early stage that only an information security scheme at an upper level by software has been proposed. Note that the processing speed is relatively slow according to the information security scheme at the upper level. Also, the information security scheme by software has a drawback that high speed data in the super highway information network cannot be processed in real time.

Recently, multimedia users who try to communicate by using the ATM technology, which is a key to the super highway information network, are increasing. However, the risk that various information in the ATM system can be lost increases due to hackers or crackers. Particularly, the information security in the super highway information network is becoming more important than in any other system since information intrusions in the super highway information network by hackers or crackers can be done within a very short period.

The conventional information security technique in the ATM has been implemented at the upper level of the super highway information network by software by using generalized processors or digital signal processors. However, according to these conventional techniques, the data processing speed is very slow. Further, these conventional techniques have a drawback that high speed data transferred via the super highway information network cannot be processed at a high speed, since they are implemented by using generalized processors or digital signal processors at the upper level of the super highway information network by software.

SUMMARY OF THE INVENTION

It is therefore an object of the present invention to provide a security device for section processor which can implement information security functions at a high speed by implementing the hardware wherein an encoder and a decoder for information security are imbedded in a section processor of the super highway information network.

In accordance with one aspect of the present invention, a security device for section processor having a STM-n rate ATM interface unit is provided wherein the interface unit comprises transmission ATM hierarchical processing means for generating and processing ATM cells for transmission; transmission ATM cell processing means for imbedding error control signals which can compensate for errors of the ATM cells from said transmission ATM hierarchical processing means; transmission path processing means for inserting various information for the operation and maintenance of a path by converting the ATM cells into one payload; AU-n pointer generating means for inserting information representing a starting point of the output data of said transmission path processing means; section encoding processing means for transmission for inserting information for the operation and maintenance of the section into the output from said AU-n pointer generating means, for performing scrambling for frame synchronization on 2,421 n bytes exclusive of 9 n bytes which are positioned on the first column of section overhead bytes, for encoding 2,424 n bytes exclusive of 6 n frame bytes on a 64 bit basis by using a block encoding algorithm, and for inserting 6 n frame bytes into the head of the encoded data to make 125 $\mu$sec frame data; and optical processing means for transmission for converting the STM-n rate electrical signal output from said section encoding processing means for transmission into an optical signal and for transmitting the converted optical signal via an optical transmission line.

In accordance with another aspect of the present invention, a security device for section processor having a STM-n rate ATM interface unit is provided wherein the interface unit comprises optical processing means for reception for converting a STM-n rate optical signal received via an optical transmission line into an electrical signal; section decoding processing means for reception for decoding 2,424 n bytes exclusive of 6 n frame bytes among the STM-n rate electrical signal on a 64 bit basis by using a block decoding algorithm, for performing descrambling for frame synchronization on 2,421 n bytes exclusive of 9 n bytes which are positioned on a first column of section overhead bytes, and for extracting various information on the operation and maintenance of the section to collect operation and maintenance information on the transmission line; AU-n pointer processing means for analyzing AU-n pointer data among the data output from said section overhead processing means for reception, and for locating a starting position of RVC4-n data among STM-n data having a period of 125 $\mu$sec; reception path processing means for extracting path operation and maintenance information from the output of said AU-n pointer processing means to perform the operation and maintenance of a reception path; received ATM cell processing means for processing error control information of ATM cells from the output of said reception path processing means, and for extracting correct ATM cells by performing an error correction on ATM cells having one error while discarding ATM cells having more than two errors; and ATM hierarchical means for reception for receiving valid ATM cells from said received ATM cell processing means.

According to the present invention, related hardware can be easily implemented by simply imbedding an encoder and a decoder in the section processor of the super highway information network. Thus, a section processor having information security functions can be easily implemented in one integrated circuit. Also, the security device for section processor in accordance with the present invention is superior to other device in terms of an information security function itself, economicity, efficiency, and power consumption efficiency.

BRIEF DESCRIPTION OF THE DRAWINGS

The present invention will become more apparent upon a detailed description of the preferred embodiments for carrying out the invention as rendered below. In the description to follow, references will be made to the accompanying drawings, where like reference numerals are used to identify like or similar elements in the various drawings and in which.

DETAILED DESCRIPTION OF THE INVENTION

The present invention performs information security on 2,424 n bytes exclusive of 6 n bytes for frame alignment which is positioned in a first column of an section overhead corresponding to a frame synchronization among data in the super highway information network. Thus, the security device for section processor in accordance with the present invention eliminates the necessity of additional separate hardware for frame synchronization of transmitted/received data. Further, the present invention perfectly performs information security functions without the loss or addition of surplus bytes within one frame.

Figure 1:
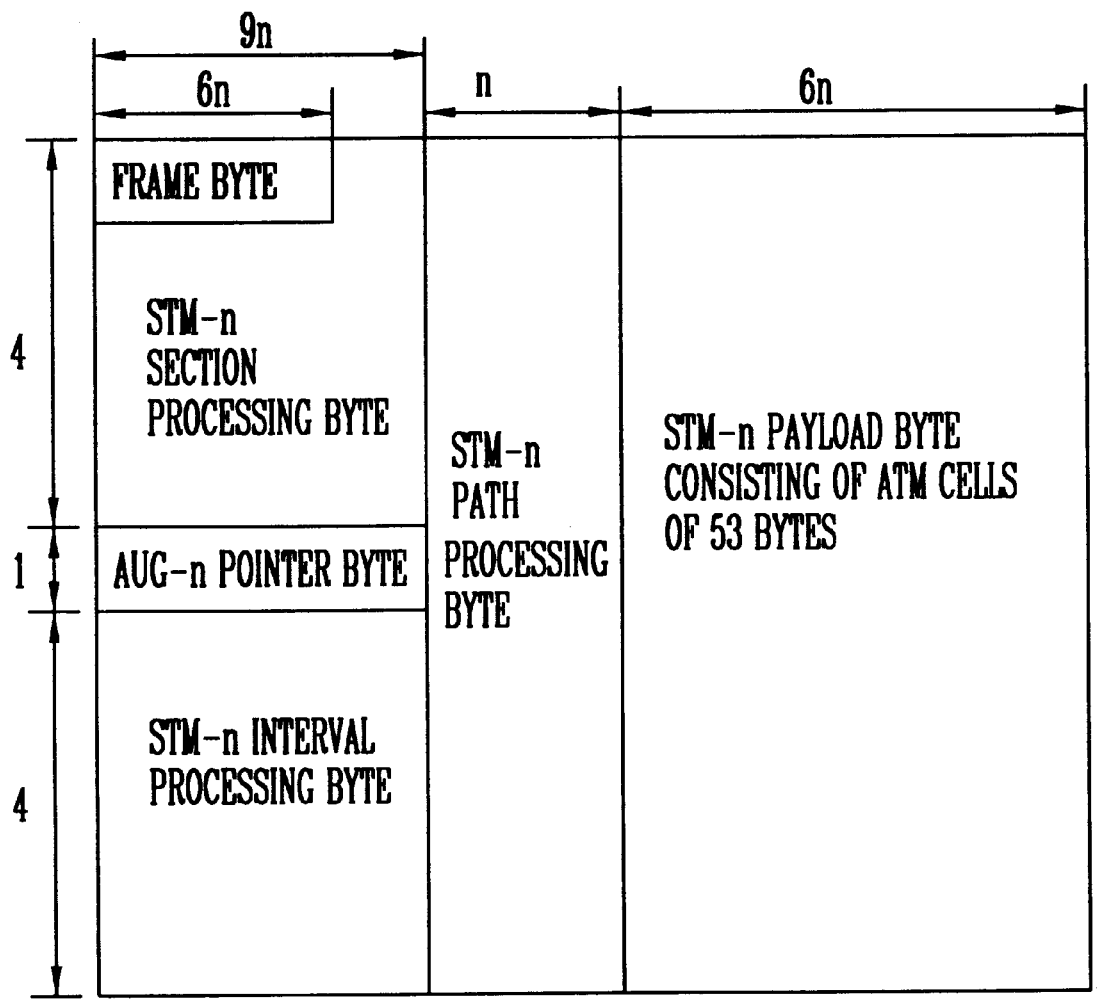
FIG. 1 shows a data structure of STM-n frame data.

FIG. 1 shows a data structure of STM-n frame data. As shown in FIG. 1, the frame section of 125 μsec which is processed in a STM-n ATM interface unit comprises a total of 2,430 n bytes. These bytes include a section overhead of 72 n bytes, a path overhead of 9 n bytes, an AUG-n pointer of 9 n bytes, and a STM-n payload of 2,340 n bytes. Particularly, 6 n bytes for frame alignment are allocated to a first column of the section overhead. Note that n is 0, 4, 16, 64, . . . , 4(m−1), where m is a positive integer.

The frame synchronization in the super highway information network is performed by using frame bytes in the ATM interface unit. Thus, frame alignment bytes comprising 6 n bytes aligned in the first column of the section overhead must not be scrambled in order to maintain frame synchronization in every STM-n.

Figure 2:
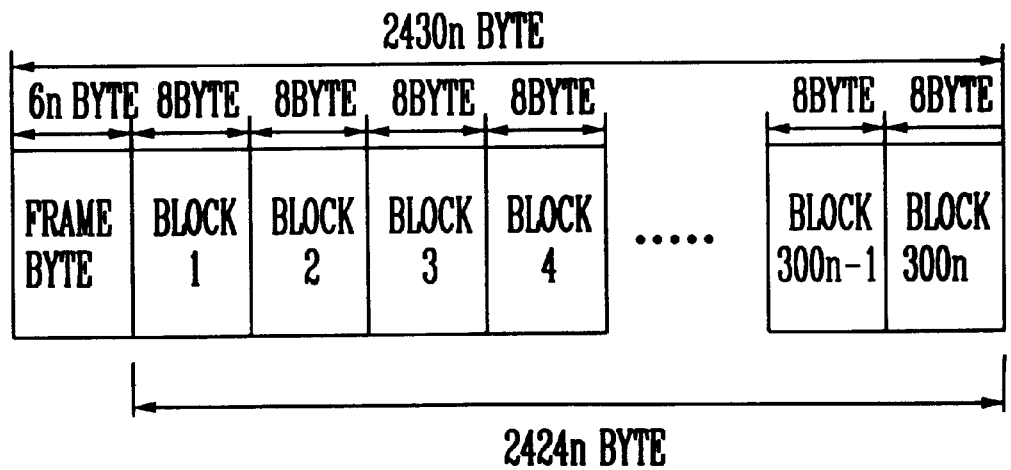
FIG. 2 shows a data structure of STM-n block data for encoding and decoding.

Thus, in accordance with the present invention, the remaining bytes exclusive of 6 n bytes for frame alignment among STM-n data are divided into 64 bit blocks, and then a block code algorithm is applied to each block as shown in FIG. 2 which shows a data structure of STM-n block data for encoding and decoding. In other words, if 2,424 n bytes exclusive of 6 n frame bytes among 2,430 n bytes of STM-n is divided by 64 bits, 303 n blocks can be obtained. As a result, the total number of blocks processed for scrambling within one frame is 303 n.

Figure 3:
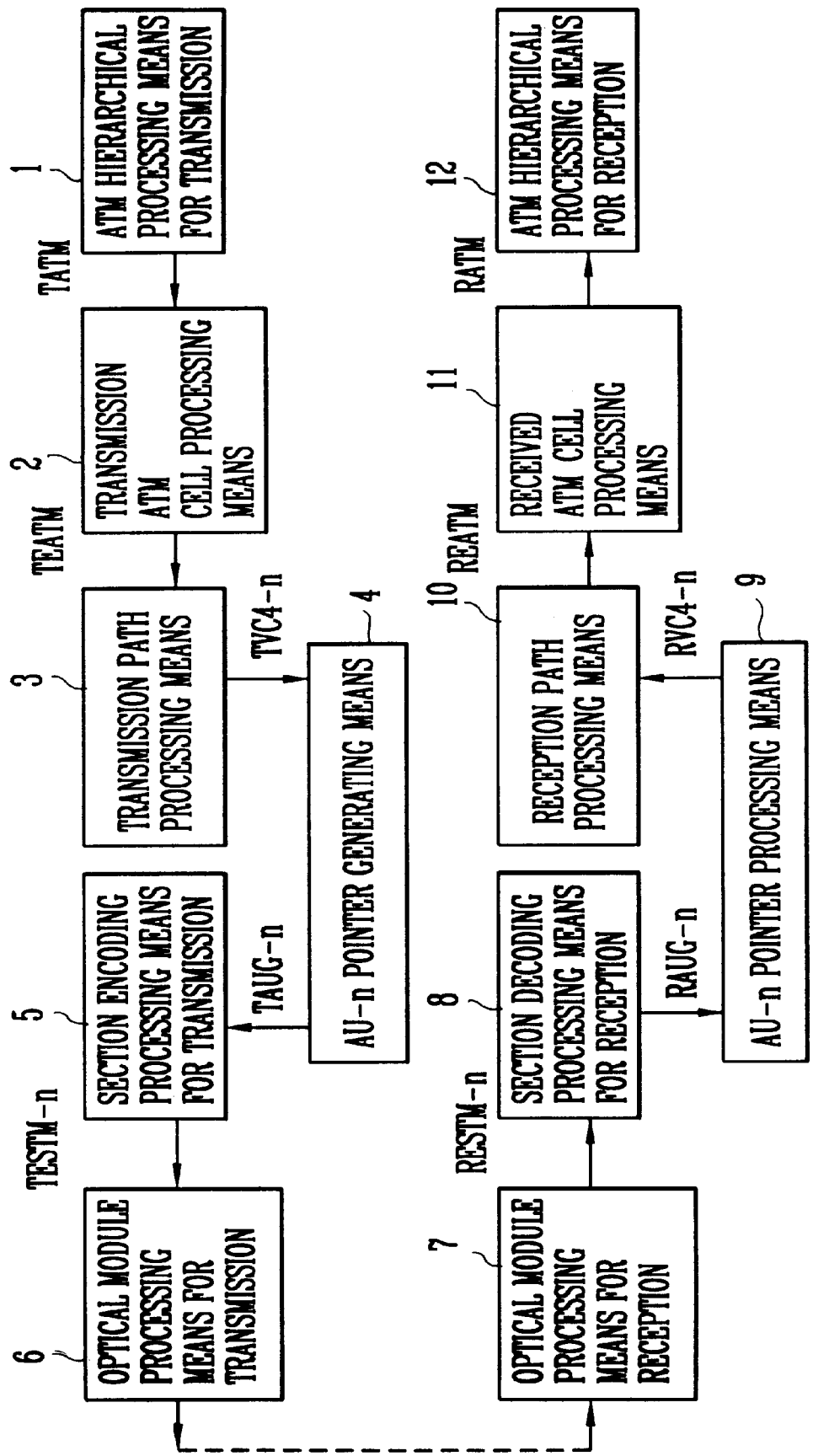
FIG. 3 shows a block diagram of a security device for section processor in accordance with the present invention.

FIG. 3 shows a block diagram of a security device for section processor in accordance with the present invention. The transmission ATM cell processing means 2 generates an ATM cell (TEATM) constituted by imbedding an error control signal, which can compensate for errors of the ATM cell, in the ATM cell (TATM) coming from ATM hierarchical processing means for transmission 1, and sends it to transmission path processing means 3. The transmission path processing means 3 inserts various information for the operation and maintenance of the path to make a virtual container (TVC4-n), and sends it to the AU-n pointer generating means 4. The AU-n pointer generating means 4 sends data (TAUG-n), in which information representing a starting point of the virtual container is imbedded, to section encoding processing means for transmission 5. The section encoding processing means for transmission 5 inserts information for operation and maintenance of the section into data (TAUG-n) coming from the AU-n pointer generating means 4, and performs scrambling for frame synchronization on 2,421 n bytes exclusive of 9 n bytes which are positioned on the first column of the section overhead bytes. Thereafter, the section encoding processing means for transmission 5 codes 2,424 n bytes exclusive of 6 n frame bytes on a 64 bit basis by using a block encoding algorithm, and inserts 6 n frame bytes into the head of the coded data to make a 125 μsec frame data (TESTM-n). The frame data (TESTM-n) is sent to optical module processing means for transmission 6. The optical module processing means for transmission 6 converts the electrical signal of STM-n into the optical signal (TSTM-n), and transmits the converted optical signal via an optical transmission line.

Meanwhile, the optical module processing means for reception 7 converts the optical signal (RSTM-n) of STM-n received via the optical transmission line into the electrical signal (RESTM-n), and sends it to the section decoding processing means for reception 7. The section decoding processing means for reception 7 decodes 2,424 n bytes exclusive of 6 n frame bytes among the received data (RESTM-n) on a 64 bit basis by using a block decoding algorithm. The section decoding processing means for reception 7 performs descrambling for frame synchronization on 2,421 n bytes exclusive of 9 n bytes which are positioned on the first column of the section overhead bytes, and extracts various information on the operation and maintenance of the section to collect operation and maintenance information on the transmission line.

The AU-n pointer processing means 9 analyze the AU-n pointer data among the data (RAUG-n) coming from the section overhead processing means for reception 28, and locates the starting position of the RVC4-n data among the STM-n data having a period of 125 μsec to transmit the exact RVC4-n data to reception path processing means 10. The reception path processing means 10 extracts path operation and maintenance information from path-type data (RVC4-n), and performs the operation and maintenance of the reception path. Received ATM cell processing means 11 processes error control information of ATM cell in data (REATM) coming from the reception path processing means 10, and performs an error correction on ATM cells having one error. However, ATM cells having more than two errors are discarded. Thus, only correct ATM cells (RATM) are sent to ATM hierarchical means for reception 12.

Figure 4:
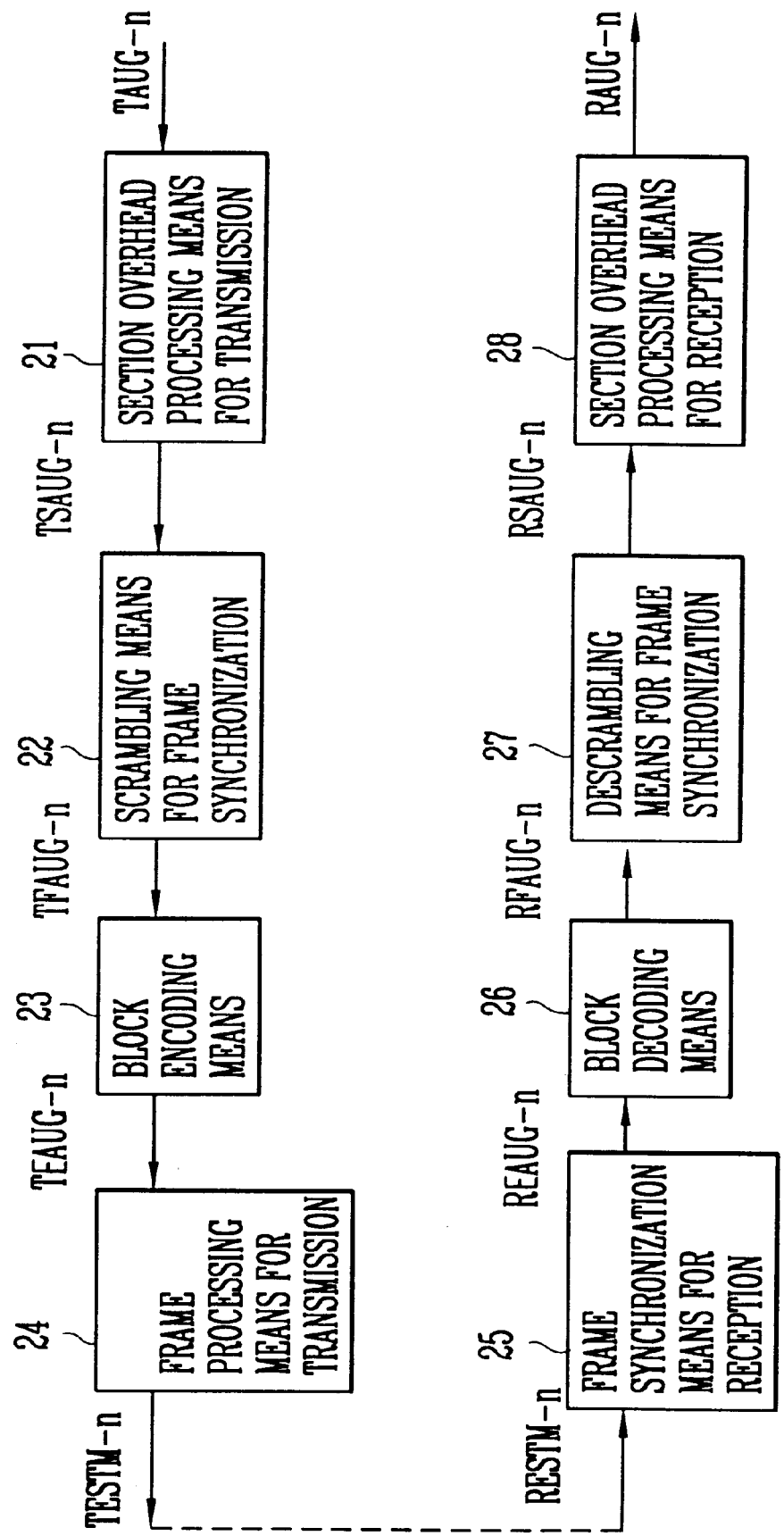
FIG. 4 shows a structure of a section processor for information security in accordance with the present invention.

FIG. 4 shows a structure of a section processor for information security in accordance with the present invention. The section overhead processing means for transmission 21 inserts operation and maintenance information of the section into data (TAUG-n) from the AU-n pointer generating means 4, and sends data (TSAUG-n) to scrambling means for frame synchronization 22. The scrambling means for frame synchronization 22 performs scrambling for frame synchronization on all TSAUG-n data exclusive of 9 n bytes which are positioned on the first column of the overhead bytes of the section among the received data (TSAUG-n). The 2,424 bytes exclusive of 6 n frame bytes positioned on the first column of the section overhead among the scrambled data TFAUG-n are coded by block encoding means 23 by using a block encoding algorithm on a 64 bit basis. The coded data (TEAUG-n) is transmitted to frame processing means for transmission 24. The frame processing means for transmission 24 inserts 6 n frame bytes into the coded 2,424 n bytes, and sends it to the optical processing means for transmission 6.

Incidentally, frame synchronization means for reception 25 performs a byte alignment and frame synchronization by using 6 n frame bytes among the electrical data (RESTM-n) output from the optical processing means for reception 7 to align all bytes of frame data of 125 μsec. Based on the aligned data, the frame synchronization means for reception 25 catches frame synchronization of the frame data of 125 μsec. Block decoding means 26 decodes 2,424 n bytes exclusive of 6 n frame bytes from data REAUG-n of 125 μsec frame-synchronized and output from the frame synchronization means for reception 25 by using a block decoding algorithm on a 64 bit basis. Descrambling means for frame synchronization 27 performs descrambling for frame synchronization on 2,421 n bytes exclusive of 9 n bytes which are positioned on the first column of the section overhead bytes of the decoded data (RFAUG-n) having a period of 125 μsec output from the decoding means. Section overhead processing means for reception 28 extracts various section overhead data having a period of 125 μsec and output from the descrambling means for frame synchronization 27 to utilize it as operation and maintenance information of the section. The section overhead processing means for reception 28 sends the final data (RAUG-n) to the AU-n pointer processing means 9.

As described above, in accordance with the present invention, the information security function in the section processor of the STM-n ATM interface unit is implemented by using a block encoding algorithm and block decoding algorithm to efficiently execute information security functions of STM-n rate high speed data in the super highway information network. Also, in accordance with the present invention, since an encoder and decoder for information security of the section processor in the STM-n rate super highway information network can be easily imbedded, it is easy to implement the STM-n rate ATM interface unit with its information security function enhanced within one integrated circuit. Also, with the present invention, the economicity, efficiency, and low power characteristics of the device can be enhanced since the information security function in the STM-n rate super highway information network can be implemented in real time.

The present invention has been described with reference to a particular embodiment in connection with a particular application. Those having ordinary skill in the art and access to the teachings of the present invention will recognize additional modifications and applications within the scope thereof.

What is claimed is:

1. A security device for a section processor having an STM-n rate ATM interface unit, said security device comprising:
    transmission ATM hierarchical processing means for generating and processing ATM cells for transmission;
    transmission ATM cell processing means for imbedding an error control signal to compensate for errors of the ATM cells from said transmission ATM hierarchical processing means;
    transmission path processing means for inserting information for operation and maintenance of a path by converting the ATM cells into one payload and generating output data;
    AU-n pointer generating means for inserting information representing a starting point of the output data from said transmission path processing means and generating output data;
    section encoding processing means for transmission for inserting information for operation and maintenance of a section into the output data from said AU-n pointer generating means, performing scrambling for frame synchronization on 2,421 n bytes exclusive of 9 n bytes which are positioned on a first column of section overhead bytes, encoding 2,424 n bytes exclusive of 6 n frame bytes on a 64 bit basis by using a block encoding algorithm, and inserting 6 n frame bytes into a head of the encoded data and generating a 125 μsec STM-n rate frame data electrical signal; and
    optical processing means for transmission for converting the frame data electrical signal output from said section encoding processing means for transmission into an optical signal and transmitting the converted optical signal using an optical transmission line.

2. The device in accordance with claim 1, wherein said section encoding processing means for transmission comprises:
    section overhead processing means for transmission for inserting operation and maintenance information of the section into the output data from said AU-n pointer generating means and generating output data;
    scrambling means for frame synchronization for performing scrambling for frame synchronization on all STM-n data exclusive of 9 n bytes which are positioned on a first column of section overhead bytes of the output data from said section overhead processing means for transmission and generating output data;
    block encoding means for encoding 2,424 bytes exclusive of 6 n frame bytes positioned on a first column of section overhead bytes of the output data from said scrambling means for frame synchronization by using a block encoding algorithm on a 64 bit basis; and
    frame processing means for transmission for inserting 6 n frame bytes into the 2,424 n bytes encoded in said block encoding means and sending the inserted 2,424 n bytes to said optical processing means for transmission.

3. A security device for a section processor having an STM-n rate ATM interface unit, said security device comprising:
    optical processing means for reception for converting an STM-n rate optical signal received through an optical transmission line into an STM-n rate electrical signal;
    section decoding processing means for reception for decoding 2,424 n bytes exclusive of 6 n frame bytes from the STM-n rate electrical signal on a 64 bit basis by using a block decoding algorithm, performing descrambling for frame synchronization on 2,421 n bytes exclusive of 9 n bytes positioned in a first column of section overhead bytes, extracting information on operation and maintenance of a section to collect operation and maintenance information for the transmission line, and generating output data;
    AU-n pointer processing means for analyzing AU-n pointer data among the output data from said section decoding processing means for reception, locating a starting position of path-type data among STM-n data having a period of 125 μsec, and generating output data;
    reception path processing means for extracting path operation and maintenance information from the output data from said AU-n pointer processing means to perform operation and maintenance of a reception path and generating output data;
    received ATM cell processing means for processing error control information of ATM cells from the output data from said reception path processing means, extracting correct ATM cells by performing an error correction on ATM cells having one error and discarding ATM cells having more than two errors;

ATM hierarchical means for reception for receiving the correct ATM cells from said received ATM cell processing means.

4. The device in accordance with claim 3, wherein said section decoding processing means comprises:

frame synchronization means for reception for performing byte alignment and frame synchronization using 6 n frame bytes from the electrical signal from said optical processing means for reception to align all bytes of frame data of 125 $\mu$sec, catching frame synchronization of frame data of 125 $\mu$sec from the aligned data, and generating output data;

block decoding means for decoding 2,424 n bytes exclusive of 6 n frame bytes among the output data from said frame synchronization means for reception using a block decoding algorithm on a 64 bit basis;

descrambling means for frame synchronization for performing descrambling for frame synchronization on 2,421 n bytes exclusive of 9 n bytes which are positioned on a first column of section overhead bytes of frame data having a period of 125 $\mu$sec output from said block decoding means, and generating output data; and section overhead processing means for reception for extracting various section overhead data of the frame data having a period of 125 $\mu$sec and the output data from said descrambling means for frame synchronization for use as operation and maintenance information of the section, and generating and transmitting final data to said AU-n pointer processing means.

* * * * *